April 30, 1929.  F. G. PURINTON  1,711,062
TOOL FOR APPLYING TAGS TO ARTICLES
Filed Feb. 18, 1926
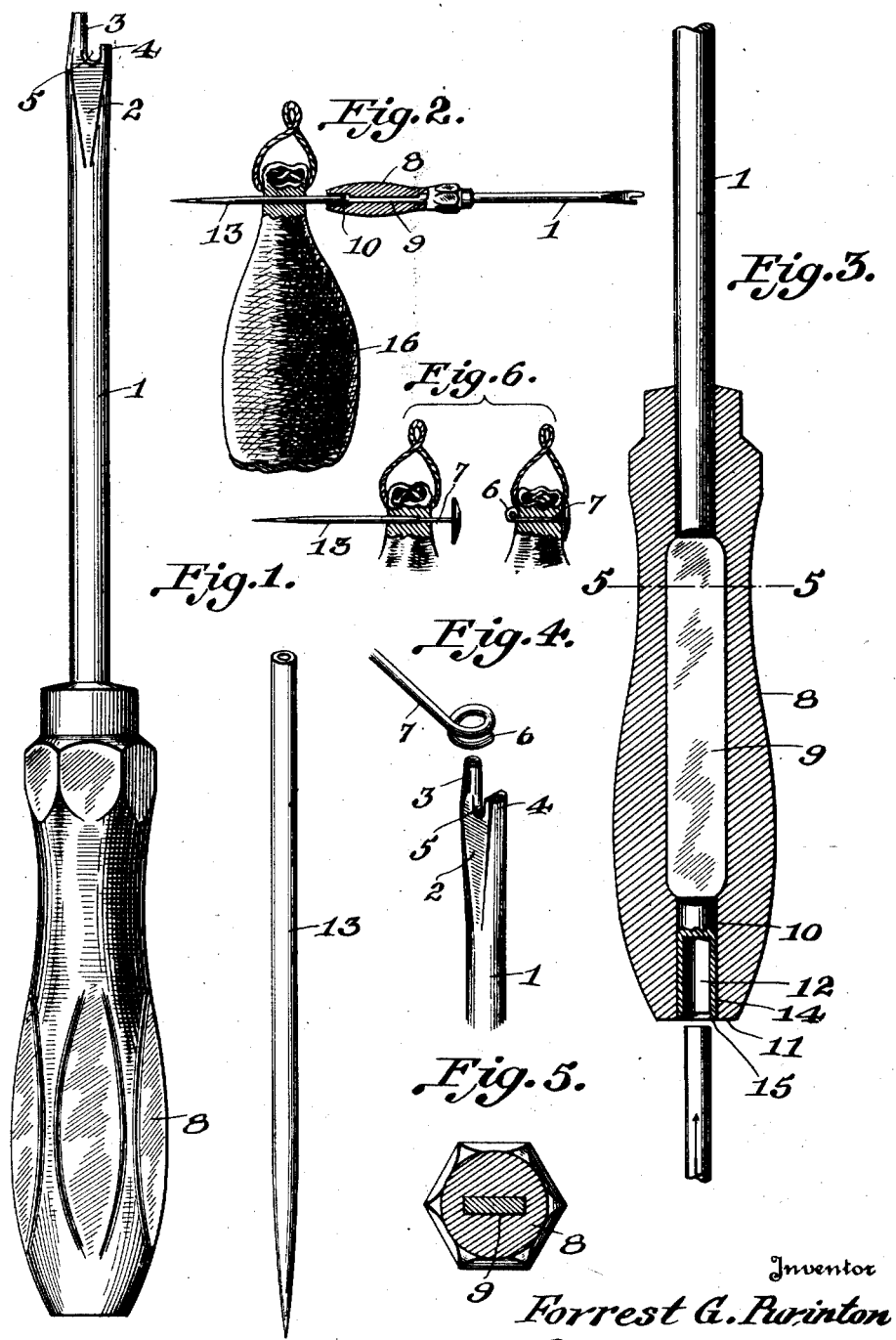

Patented Apr. 30, 1929.

1,711,062

UNITED STATES PATENT OFFICE.

FORREST G. PURINTON, OF WATERBURY, CONNECTICUT, ASSIGNOR TO THE PATENT BUTTON COMPANY, OF WATERBURY CONNECTICUT, A CORPORATION OF CONNECTICUT.

TOOL FOR APPLYING TAGS TO ARTICLES.

Application filed February 18, 1926. Serial No. 89,253.

My invention relates to new and useful improvements in a tool for applying tags to such articles as meats, hams, fowls or other edible objects of a similar nature. An object of the invention is to provide a tool, one end of which is adapted to receive an awl to pierce the article to be tagged while the other end of the tool is so formed that the end of the spindle of the tag may be quickly curled after the same has been placed through the article to be tagged.

In two patents issued to me, Nos. 1,570,399 and 1,570,400 and a third shortly to issue, No. 1,573,861, there are shown tags having a shank or spindle formed of metal of limited ductility, and a head insecurely fastened to the shank. After the spindle of the tag is placed through the object tagged, the end is curled to tightly hold the tag in position.

The present invention provides a tool for piercing the article and for completing the tagging operation.

Still another object of the invention is to provide a tool wherein both ends are utilized, one end of the tool receiving a removable awl, and the other for curling the spindle of the tag.

With these and other objects in view, the invention consists in certain new and novel arrangements and combination of parts, as will be hereinafter more fully described and pointed out in the claim.

Referring now to the drawings, showing a preferred embodiment of my invention,

Fig. 1 is a view in elevation of my improved tool, and a removable awl to be inserted in the rear end of the handle.

Fig. 2 is a reduced view showing a ham and the manner of piercing the same with the awl, a portion of the handle of the tool being shown in section for the sake of clearness.

Fig. 3 is a fragmentary view of the tool showing the handle in section and the manner in which the shank of the tool is flattened before being cast into the handle.

Fig. 4 is a fragmentary view showing the upper end or nose of the tool illustrating the manner of curling the shank of a tag.

Fig. 5 is a sectional view taken on line 5—5 of Fig. 2, of the tool, and

Fig. 6 shows two reduced fragmentary views of a tag, one being still within the awl and the other as finally secured to the article.

Referring more specifically to the several views, there is shown a tool comprising a metal shank 1 tapered at its upper end as at 2, and provided with the short nose 3 which is also tapered, while directly beneath the nose is formed the lip 4, the lip and the inner end of the nose forming a recess 5 so that the end 6 of a spindle of a tag 7 may be placed within this recess and a turning of the shank 1 will coil the end, as may be readily understood.

The tag 7, per se, does not form a part of this invention, as these tags form the subject matter of three separate inventions shown in Patents Nos. 1,570,399, 1,570,400 and 1,573,-861.

It might be mentioned here, for the sake of explanation, however, that the tags comprise a head and shank, the shank being formed of metal of limited ductility, so that after the tag is once applied, it cannot be removed without destroying the same, as any turning or twisting of the curl to endeavor to straighten the same will cause the curl to snap from the shank.

As may be seen in Fig. 3, about the shank 1 of the tool and at a distance from the nose, there is preferably secured, by casting or molding, a metal handle 8, which may be of aluminum, while the diameter is such that it may be firmly gripped by the operator. To prevent any turning of the shank within the handle, I first flatten or swedge a part of the shank as at 9, so that when the handle is cast or molded about the shank, this flattened portion will prevent any movement of the shank within the handle, regardless of the tortional strain placed upon the handle.

As shown in Fig. 3, the rear end of the shank 10, in its natural shape, extends to the rear end 11 of the handle and is preferably drilled as at 12 for the reception of the rear end of a tubular awl 13. Of course, the rear end of the handle 11 is drilled as at 14, and I countersink the hole as at 15, so that the continuous use of the awl will not burr the hole.

In Fig. 2 I have shown, on a reduced scale, a small ham 16 and to apply the tag or seal, I place the awl 13 within the rear of the handle and then force the awl 13 through the neck 17 of the ham. After this awl is in position, the tool is removed from the awl and the shank of a tag is placed within the awl, as shown in Fig. 6, and the awl then pulled through the neck of the ham, leaving the tag in place. After this, the end 6 of the tag 7 is placed between the nose 3 and the lip 4 of the tool and the end curled to tightly pull the tag in position and prevent any removal of the tag (see Fig. 6).

By tapering the end of the tool as shown, the tool may be quickly removed from the curled end of the tag.

In the patents above referred to, it was necessary to use an additional instrument to force the awl through the ham, but in the present instance, the tool described and the removable awl constitute the only means necessary for applying the tags to articles to be sealed.

From the foregoing it will be seen that I have provided a very simple method of applying tags or seals to edible articles and that I have provided a tool for carrying out the method, which tool is relatively cheap to manufacture, efficient in service, and comprises but two separate parts.

Having thus described my invention, what I claim as new and desire to secure by Letters Patent is:—

A tool for forming a coil at the end of a spindle consisting of a shank having at its end a nose portion located beyond one side of the axis of the shank, said nose portion being tapered from the point of juncture with the shank to the extremity thereof, said shank having at the same end a lip portion located beyond the opposite side of the shank from that side thereof at which the nose portion is located, said lip portion having an inner plane surface disposed parallel with the axis of the shank and spaced from the adjacent side of the nose portion providing a recess between said portions, the opposite side surfaces of the recess lying in parallel planes and the tapered nose portion being of greater length than the lip portion whereby one of the said parallel plane surfaces is of greater length than the other.

In testimony whereof I affix my signature.

FORREST G. PURINTON.